(12) United States Patent
Tomasetti et al.

(10) Patent No.: US 7,356,885 B2
(45) Date of Patent: Apr. 15, 2008

(54) SIZE-INDICATING CABLE TIE

(75) Inventors: Kenneth Tomasetti, Phillipston, MA (US); David A. Hewes, Chesterfield, MA (US); Greg Letendre, Templeton, MA (US)

(73) Assignee: Advanced Cable Ties, Inc., Gardner, MA (US)

( * ) Notice: Subject to any disclaimer, the term of this patent is extended or adjusted under 35 U.S.C. 154(b) by 0 days.

(21) Appl. No.: 11/373,659

(22) Filed: Mar. 10, 2006

(65) Prior Publication Data

US 2007/0209164 A1 Sep. 13, 2007

(51) Int. Cl.
*B65D 67/02* (2006.01)
*B65D 63/00* (2006.01)

(52) U.S. Cl. .................................................. 24/16 PB

(58) Field of Classification Search ...................... None
See application file for complete search history.

(56) References Cited

U.S. PATENT DOCUMENTS

| | | | | |
|---|---|---|---|---|
| 5,031,943 A | * | 7/1991 | Scott et al. ............. | 292/307 R |
| 5,452,523 A | * | 9/1995 | Jansen ...................... | 24/23 R |
| 5,704,097 A | * | 1/1998 | Rahav ...................... | 24/16 PB |
| 5,745,957 A | * | 5/1998 | Khokhar et al. .......... | 24/16 PB |
| 6,578,239 B2 | * | 6/2003 | Hatch ....................... | 24/16 PB |
| 6,763,553 B2 | * | 7/2004 | Hatch ....................... | 24/16 PB |
| 2005/0268435 A1 | * | 12/2005 | Moughelbay et al. ..... | 24/16 PB |

* cited by examiner

*Primary Examiner*—Robert J. Sandy
(74) *Attorney, Agent, or Firm*—Brian M. Dingman; Mirick, O'Connell, DeMallie & Lougee

(57) ABSTRACT

A cable tie with a flexible strap having an elongated section defining a longitudinal axis, the strap having a head end, a tail end, a top side and a lower side, the lower side defining a plurality of longitudinally spaced apart teeth extending transversely to the longitudinal axis. The tie also has a head defining a channel defined by side and top walls and adapted to receive the strap, and a latch adapted to engage with one or more teeth of the strap, to retain the strap in the head. There are a series of visible markings spaced along the top side of the strap. These markings indicate the diameter of the engaged strap.

16 Claims, 3 Drawing Sheets

SIZE-INDICATING CABLE TIE

FIELD OF THE INVENTION

This invention relates to a cable tie for constraining two or more objects.

BACKGROUND OF THE INVENTION

Cable ties generally consist of a band with a head attached to one end of the band. The free end of the band feeds through the head to form a loop enclosing the objects being tied together, which, for example, may be two or more electrical wires of a wiring harness. The head typically contains locking teeth which interlock with teeth in the band during band adjustment, and then maintain a desired band periphery. One example of a low-profile cable tie is found in U.S. Pat. No. 6,578,239, the disclosure of which is incorporated herein by reference.

Cable ties are normally finish-tightened and cut off by a tool that tightens the engaged tie to a pre-set tension and cuts off the tail in a single motion. If the tension is not properly set, the tie will be installed either too tightly or too loosely. In cases in which proper tension is critical, such as with vehicle wiring harnesses, wires that are held too loosely can chafe and fray, and wires that are overly tightly held can be compromised by the cable tie (e.g., their insulation can be overly compressed, cut or nicked). In such cases, shorting, reduced data flow or data cross-talk can result. A shorted wiring harness can cause catastrophic failure (for example in a helicopter or other aircraft), or at the least can cause a failure that can be extremely problematic or expensive to repair. Cross-talk and data slowdowns can be extremely problematic as well.

SUMMARY OF THE INVENTION

It is therefore an object of this invention to provide a cable tie with one or more markings that indicate the engaged tie diameter. When installed on a wire bundle or other structure of predetermined diameter, the markings thus visually indicate whether the tie has been installed properly, to the proper tension. The inventive tie thus helps to ensure proper installation by providing immediate visual feedback to the installer, and also allows for post-installation inspection that is not possible today.

The invention may be accomplished with a cable tie for tieing together two or more objects. The cable tie has a flexible strap with an elongated section defining a longitudinal axis, a head end, a tail end, a top side and a lower side. The lower side defines a plurality of longitudinally spaced apart teeth extending transversely to the axis. The cable tie also has a head integrally joined to the head end of the strap. The invention applies to all types of cable ties and all types of cable tie heads, both traditional and low-profile heads, for example. The head has an opening that receives the tail end of the strap, and a latching structure that engages with one or more of the teeth in the strap to lock the strap in the head. After insertion of the tail end of the strap through the head and tightening the cable tie to the proper tension, the tail end of the strap projecting from the head is typically cut off.

The top side of the strap has one or more size-indicating markings; typically there are a series of spaced markings which are distinguishable from one another. The markings are arranged such that at least one marking is visible within the head when the strap is engaged with the head in the desired installed position. The markings may be numbers, or not. The markings indicate the approximate diameter of the items that are engaged by the cable tie.

This invention features a cable tie comprising a flexible strap comprising an elongated section defining a longitudinal axis and having a head end, a tail end, a top side and a lower side, the lower side defining a plurality of longitudinally spaced apart teeth extending transversely to the longitudinal axis, a head defining a channel defined by side and top walls and adapted to receive the strap, and a latch adapted to engage with one or more teeth of the strap, to retain the strap in the head, and a series of visible markings spaced along the top side of the strap.

The head may further define an opening through which the strap is visible when the strap is engaged in the head. At least one marking may be visible through the opening when the strap is engaged in the head. The markings may comprise numbers. The numbers may be ascending, with the lowest number located closest to the head. The markings may be indicative of the diameter of the engaged tie. The markings may be arranged along the length of the top side of the strap beginning proximate the head end. The markings may terminate before the tail end of the strap.

BRIEF DESCRIPTION OF THE DRAWINGS

These and other objects and features of the invention will become more apparent based upon the following description together with the accompanying drawings, in which.

DETAILED DESCRIPTION OF THE PREFERRED EMBODIMENT

Figure 1:
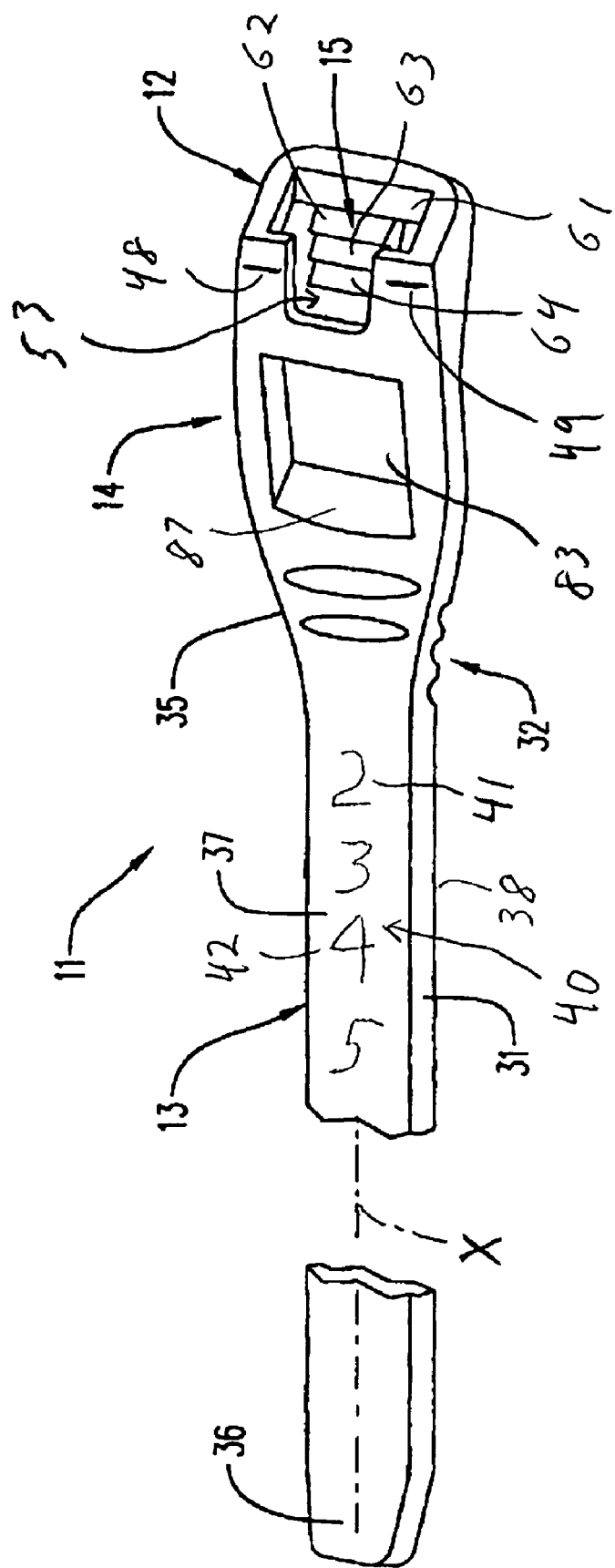
FIG. 1 is a top perspective view of a preferred embodiment of the cable tie according to the invention.
Figure 2:
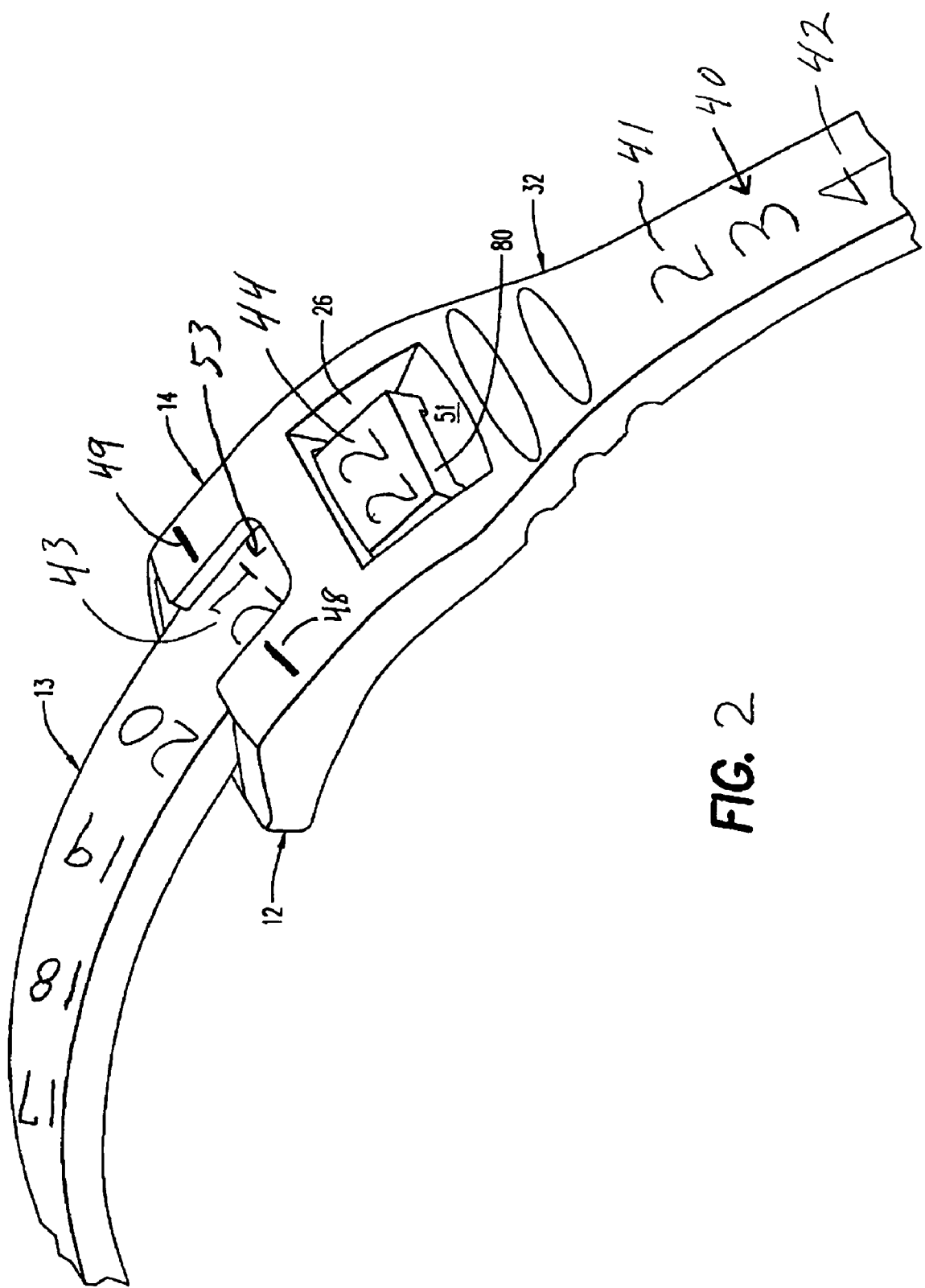
FIG. 2 is a partial perspective view of the cable tie of FIG. 1 engaged around cables tied together by the cable tie.
Figure 3:
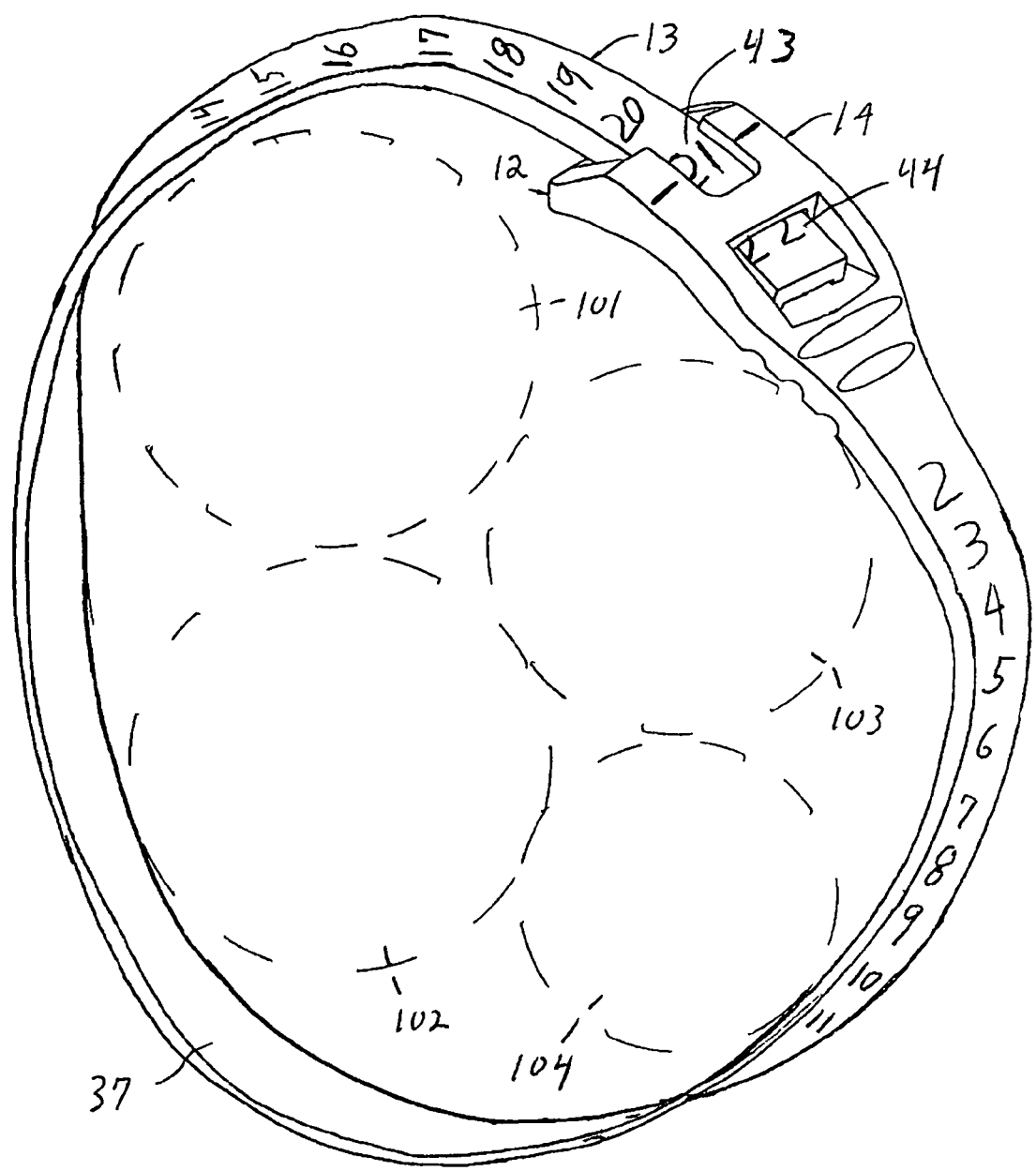
FIG. 3 is an enlarged, more schematic view of the cable tie of FIG. 2.

Cable tie 11 according to this invention, typically used for securing together multiple articles such as wires of a wiring harness, is illustrated in FIGS. 1-3. Tie 11 has an insertion guide portion 12 that is part of head 14, flexible strap 13 that is integrally joined to head 14, and latch 15 attached to head 14. Strap 13 includes elongated section 31 with a longitudinal axis X, and transition section 32 joining head 14 to elongated section 31. Defined by elongated section 31 is tail end 36 for insertion into head 14 through guide portion 12. Also defined by elongated section 31 are top side 37 and lower side 38, a major length of which defines a plurality of longitudinally spaced apart teeth (not shown in the drawings) extending transversely to axis X. Elongated section 31 has a uniform cross-section and corresponding uniform width.

Latch 15 is a flexible pawl 61 that engages with the teeth in the bottom side of the strap. Defined in an upper surface of pawl 61 are a plurality of longitudinally spaced, transversely extending teeth 62-64 arranged to engage the teeth of the strap.

In use, the tie 11 is secured, for example, around a bundle of objects such wires 101-104, FIG. 3. During the securing process, tail end 36 of strap 31 is passed through guide portion 12 and up through opening 83. Tail end 36 then is pulled to tightly tension tie 11 around the bundle. In a final tightened position of tie 11, teeth 62-64 of pawl 61 engage teeth on lower side 38 of strap section 31. This prevents reverse loosening movement of strap 13 within head 14. As the tie is tightened on the bundle, engagement of portions thereof with pawl 61 exerts an upwardly directed force on a lower surface of pawl 61 so as to more tightly engage the two sets of teeth 39. As tail end 36 of the strap exits inner opening 83, engagement with ramp surface 87 produces upward movement of the strap, which facilitates severing of the protruding excess strap portion.

Top side 37 carries at least one, and typically caries a number of, visible markings along axis "X" of some or all of elongated section 31. In the embodiment, these markings are a series of ascending numbers 40, although other marking schemes could be employed (such as letters or non-alphanumeric markings). The numbers indicate a position along section 31. When section 31 is engaged with head 14, one number shows in opening 53. See FIGS. 2 and 3, in which the number "21" (labeled 43) is visible through opening 53. Alignment markings 48 and 49 can be included to visually indicate where within head 14 the operator should look for the marking (number) indicative of the current diameter defined by the engaged tie.

Marking 40 in this case begins with the number "2" (labeled 41), includes the number "4" (labeled 42), and, after the protruding tail has been cut off, ends at about number "22" (labeled 44). This is obviously only an example. Marking 40 can be created in the cable tie mold (for example, molded-in letters, shapes or symbols), or added later, for example by engraving the tie (which may be accomplished with a laser engraver that creates permanent markings), or hot stamping the tie.

Marking 40 is designed such that it indicates a particular one, or a set of engaged diameters, that is appropriate for the purpose of the tie. The marking can be designed to achieve a desired result. For example, the smallest possible diameter can be indicated with the first number, shape, symbol or color, for example, such as the number "2" in this case. When the ties are used to tie together wires of a wiring harness, the number and gauge of wires and the desired tie tension establish a proper engaged tie diameter. The operator installing the ties is typically instructed to tighten the tie to a particular tension. The resulting proper diameter is indicated by a particular number (the number "21" in the instance shown in FIGS. 2 and 3). The operator can check himself or herself by ensuring that the proper number shows in window 53. Also, a quality control operator can later, at a glance, ensure that the tie was installed to the proper tension. For a custom tie, a single mark may be sufficient, for example a green dot that is visible in the window after proper installation, or perhaps a green area bordered by red areas, in which the red indicates that the tie is too loose or too tight.

Although specific aspects of the invention are shown in some drawings and not others, this is not a limitation of the invention. Rather, the invention is defined by the following claims.

What is claimed is:

1. A cable tie comprising:
   a flexible strap comprising an elongated section defining a longitudinal axis and having a head end, a tail end, a top side and a lower side, the lower side defining a plurality of longitudinally spaced apart teeth extending transversely to the longitudinal axis;
   a head defining a channel defined by side and top walls and adapted to receive the strap, an opening through which the strap is visible when the strap is engaged in the head, and a flexible pawl defining a plurality of longitudinally spaced, transversely extending teeth adapted to engage with one or more teeth of the strap, to retain the strap in the head; and
   a series of visible markings spaced along the top side of the strap, where the visible markings are indicative of a diameter of the engaged tie, and at least one marking is visible through the head opening when the strap is engaged in the head.

2. The cable tie of claim 1 in which the visible markings comprise a series of numbers.

3. The cable tie of claim 2 in which the numbers are ascending, with the lowest number located closest to the head.

4. The cable tie of claim 1 in which the markings are arranged along the length of the top side of the strap beginning proximate the head end.

5. The cable tie of claim 4 in which the markings terminate before the tail end of the strap.

6. A cable tie comprising:
   a flexible strap comprising an elongated section defining a longitudinal axis and having a head end, a tail end, a top side and a lower side, the lower side defining a plurality of longitudinally spaced apart teeth extending transversely to the longitudinal axis;
   a head defining a channel defined by side and top walls and adapted to receive the strap, and a flexible pawl adapted to engage with one or more teeth of the strap, to retain the strap in the head; where the flexible pawl defines a plurality of longitudinally spaced, transversely extending teeth adapted to engage with one or more teeth of the strap; and
   one or more visible markings on the top side of the strap, where the visible markings are indicative of a diameter of the engaged tie.

7. The cable tie of claim 6 in which the markings comprise numbers.

8. The cable tie of claim 7 in which the numbers are ascending, with the lowest number located closest to the head.

9. The cable tie of claim 6 in which the markings are arranged along the length of the top side of the strap beginning proximate the head end.

10. The cable tie of claim 9 in which the markings terminate before the tail end of the strap.

11. The cable tie of claim 6 where the visible markings are spaced along the top side of the strap.

12. A cable tie comprising:
    a flexible strap comprising an elongated section defining a longitudinal axis and having a head end, a tail end, a top side and a lower side, the lower side defining a plurality of longitudinally spaced apart teeth extending transversely to the longitudinal axis;
    a head defining a channel defined by side and top walls and adapted to receive the strap, an opening through which the strap is visible when the strap is engaged in the head, and a flexible pawl defining an upper surface comprising a plurality of longitudinally spaced, transversely extending teeth adapted to engage with one or more teeth of the strap, to retain the strap in the head; and
    a series of visible markings spaced along the top side of the strap, where the visible markings are indicative of a diameter of the engaged tie and where at least one marking is visible through the head opening when the strap is engaged in the head.

13. The cable tie of claim 12 in which the markings comprise numbers.

14. The cable tie of claim 13 in which the numbers are ascending, with the lowest number located closest to the head.

15. The cable tie of claim 12 in which the markings are arranged along the length of the top side of the strap beginning proximate the head end.

16. The cable tie of claim 15 in which the markings terminate before the tail end of the strap.

* * * * *